United States Patent
Chisnall et al.

(10) Patent No.: US 12,326,809 B2
(45) Date of Patent: Jun. 10, 2025

(54) DYNAMICALLY ALLOCATABLE PHYSICALLY ADDRESSED METADATA STORAGE

(71) Applicant: Microsoft Technology Licensing, LLC, Redmond, WA (US)

(72) Inventors: David Thomas Chisnall, Cambridge (GB); Nathaniel Wesley Filardo, Cambridge (GB); Robert McNeill Norton-Wright, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/385,765

(22) Filed: Jul. 26, 2021

(65) Prior Publication Data

US 2023/0029331 A1    Jan. 26, 2023

(51) Int. Cl.
*G06F 12/02* (2006.01)
(52) U.S. Cl.
CPC .... *G06F 12/0292* (2013.01); *G06F 2212/651* (2013.01)
(58) Field of Classification Search
CPC .................. G06F 12/0292; G06F 2212/651
USPC .......................................................... 711/206
See application file for complete search history.

(56) References Cited

U.S. PATENT DOCUMENTS

| | | | | |
|---|---|---|---|---|
| 9,727,256 B1 * | 8/2017 | Mayatskikh | .......... | G06F 3/0607 |
| 2008/0222397 A1 * | 9/2008 | Wilkerson | ............ | G06F 12/145 712/E9.016 |
| 2008/0320282 A1 * | 12/2008 | Morris | .................. | G06F 9/3861 712/214 |

(Continued)

FOREIGN PATENT DOCUMENTS

| CN | 109508304 B | * | 10/2021 | ......... G06F 12/1009 |
|---|---|---|---|---|
| WO | 2021092138 A1 | | 5/2021 | |

OTHER PUBLICATIONS

"Armv8.5—A Memory Tagging Extension", In White Paper of ARM, Oct. 19, 2020, 9 Pages.
"Morello-Arm Developer", Retrieved from: https://developer.arm.com/architectures/cpu-architecture/a-profile/morello, Retrieved on: Jul. 20, 2021, 8 Pages.
Watson, et al., "Capability Hardware Enhanced RISC Instructions (CHERI)", Retrieved from: https://www.cl.cam.ac.uk/research/security/ctsrd/cheri/, Retrieved on: Jul. 20, 2021, 3 Pages.

(Continued)

*Primary Examiner* — Gautam Sain
*Assistant Examiner* — Wei Ma
(74) *Attorney, Agent, or Firm* — Barta Jones, PLLC

(57) ABSTRACT

In examples there is a computing device comprising a processor, the processor having a memory management unit. The computing device also has a memory that stores instructions that, when executed by the processor, cause the memory management unit to receive a memory access instruction comprising a virtual memory address; translate the virtual memory address to a physical memory address of the memory, and obtain permission information associated with the physical memory address. Responsive to the permission information indicating that metadata is permitted to be associated with the physical memory address, a check is made of a metadata summary table stored in the physical memory to check whether metadata is compatible with the physical memory address. Responsive to the check being unsuccessful, a trap is sent to system software of the computing device in order to trigger dynamic allocation of physical memory for storing metadata associated with the physical memory address.

20 Claims, 9 Drawing Sheets

(56) References Cited

U.S. PATENT DOCUMENTS

| | | | |
|---|---|---|---|
| 2009/0240869 A1* | 9/2009 | O'Krafka | G06F 12/0284 |
| | | | 710/316 |
| 2010/0169382 A1* | 7/2010 | Sheaffer | G06F 12/1027 |
| | | | 707/E17.014 |
| 2013/0185488 A1 | 7/2013 | Talagala et al. | |
| 2019/0044729 A1* | 2/2019 | Chhabra | H04L 9/14 |
| 2019/0196977 A1 | 6/2019 | Cong et al. | |
| 2020/0019515 A1* | 1/2020 | Koufaty | G06F 12/1483 |
| 2020/0159676 A1* | 5/2020 | Durham | G06F 21/12 |
| 2020/0379902 A1* | 12/2020 | Durham | G06F 12/1408 |
| 2021/0081121 A1* | 3/2021 | Curewitz | G06F 12/1036 |
| 2021/0117342 A1* | 4/2021 | Durham | G06F 12/1491 |
| 2021/0200685 A1* | 7/2021 | Gabor | G06F 12/0895 |
| 2021/0200686 A1 | 7/2021 | Gabor et al. | |
| 2022/0129388 A1* | 4/2022 | Balakrishnan | G11C 11/5628 |

OTHER PUBLICATIONS

Joannou, et al., "Efficient Tagged Memory", Retrieved from: https://www.cl.cam.ac.uk/research/security/ctsrd/pdfs/201711-iccd2017-efficient-tags.pdf, Retrieved on Jul. 26, 2021, 8 Pages.

Jiang, et al., "Coordinated Multilevel Buffer Cache Management with Consistent Access Locality Quantification", In Journal of IEEE Transactions on Computers, vol. 56, Issue 1, Jan. 1, 2007, pp. 95-108.

"International Search Report and Written Opinion Issued in PCT Application No. PCT/US22/031865", Mailed Date: Sep. 28, 2022, 15 Pages.

Office Action Received for European Application No. 22736085.6, mailed on Mar. 5, 2024, 03 pages.

* cited by examiner

DYNAMICALLY ALLOCATABLE PHYSICALLY ADDRESSED METADATA STORAGE

BACKGROUND

Several hardware security schemes involve associating metadata with physical memory so that when data is read or written to physical memory the associated metadata can be checked in order to enforce specific security policies or alter system behavior.

The embodiments described below are not limited to implementations which solve any or all of the disadvantages of known ways of storing and using metadata in physical memory.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computing device comprising a processor, the processor having a memory management unit. The computing device also has a memory that stores instructions that, when executed by the processor, cause the memory management unit to receive a memory access instruction comprising a virtual memory address, translate the virtual memory address to a physical memory address of the memory, and obtain information associated with the physical memory address, the information being one or more of: permission information and memory type information. Responsive to the information indicating that metadata is permitted to be associated with the physical memory address, a check is made of a metadata summary table stored in the physical memory to check whether metadata is compatible with the physical memory address. Responsive to the check being unsuccessful, a trap is sent to system software of the computing device in order to permit dynamic allocation of physical memory for storing metadata associated with the physical memory address. In some examples the metadata summary table is cacheable at a cache of the processor.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

The term "page" is used in this document to refer to a unit of memory which is the same or different from a unit of memory used by a memory management unit.

In the examples described herein a processor which is a CPU is described. The examples are also workable where the processor is any processor connected to a cache-coherent interconnect, such as an accelerator.

As mentioned above, several hardware security schemes involve associating metadata with physical memory so that when data is read or written to physical memory the associated metadata can be checked in order to enforce specific security policies. Examples of such hardware security schemes include but are not limited to: memory tagging extension (MTE), and capability hardware enhanced RISC instructions (CHERI). Metadata associated with physical memory is also usable for other purposes other than hardware security schemes.

Typical hardware security schemes that involve associating metadata with physical memory carve out a range of physical memory to store metadata. The inventors have recognized that unacceptable memory overheads arise for cloud deployments where compute nodes in the cloud deployment carve out ranges of physical memory in order to store metadata associated with physical memory for hardware security schemes or other purposes. In the case of MTE, memory overhead is as much as $1/32$ of all memory even where only a single virtual machine (VM) on a server is making use of the metadata.

In various embodiments there is a mechanism involving a (much smaller, typically $1/512$) fixed reservation of physical memory to store a metadata summary table that can store coarse-grained metadata where desirable and stores pointers to dynamically allocated physical memory storing fine-grained metadata. Implementing such a metadata summary table is not straightforward since processing overheads are to be kept low whilst also enabling operations which are not using the metadata to be unaffected as much as possible. In embodiments there is a mechanism for deploying a metadata summary table and dynamic allocation of physical memory for storing fine-grained metadata in typical central processing unit (CPU) designs and a set of software abstractions for managing it.

Figure 1:
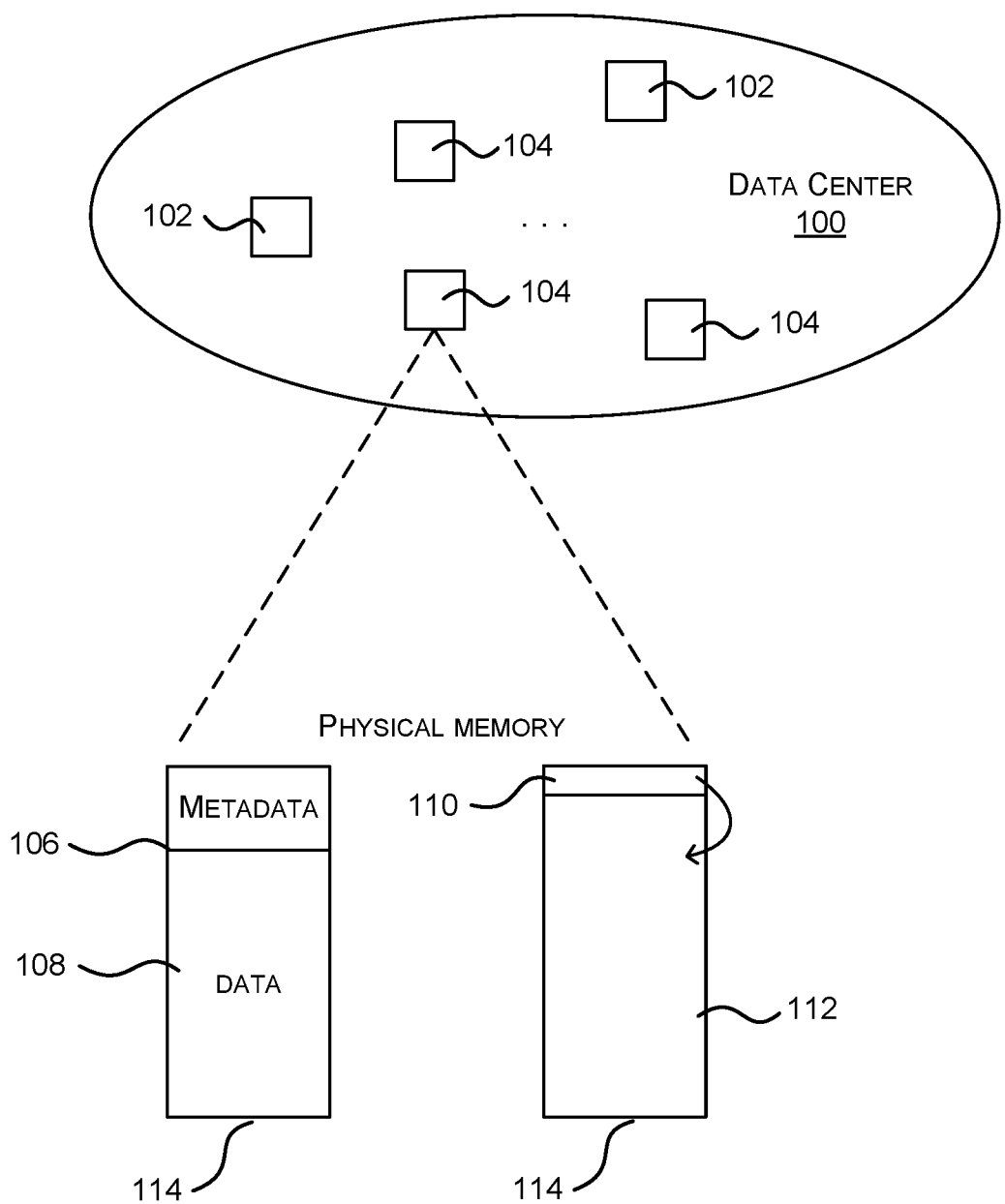
FIG. 1 is a schematic diagram of a data center and showing physical memory of a compute node of the data center, where the physical memory stores data and metadata separately.

FIG. 1 is a schematic diagram of a data center 100 and showing physical memory 114 of a compute node 104 of the data center 100, where the physical memory 114 stores data and metadata associated with the data, separately. The data center 100 comprises a plurality of compute nodes 102, 104. Each compute node has a central processing unit (CPU) and physical memory 114. The compute nodes 102, 104 are optionally in communication with one another via a communications network. The compute nodes are used to provide cloud computing services such as by executing applications and providing functionality of the applications to client devices over a communications network such as the Internet.

In an example there is a first plurality of compute nodes 102 and a second plurality of compute nodes 104. Each compute node 104 has only virtual machines which are using metadata. In contrast, each compute node 102 has at least one virtual machine which is not using metadata.

FIG. 1 shows an enlarged view of physical memory of one of the compute nodes according to a first approach (on the left hand side) and according to a second approach (on the right hand side). In both the first and second approaches data and metadata associated with the data, are stored separately in physical memory. Being stored separately means that the locations in memory are not necessarily adjacent for a given piece of data and its associated metadata.

According to the first approach (on the left hand side) a range of physical memory 106 is reserved in physical memory 114 for storing metadata whilst the remaining physical memory 108 is for storing data. The inventors have recognized that unacceptable memory overheads arise with the first approach since each compute node reserves a range of physical memory 106 for storing metadata even if the compute node is one of the compute nodes 102 with only one virtual machine using the hardware security or other scheme. According to the first approach (on the left hand side) the range of physical memory 106 reserved for storing metadata is allocated when the compute node boots and is often as much as 3% of physical memory. Suppose the data centre has multiple tenants only 25% of which are using the hardware security or other scheme. As the metadata allocation does not scale with tenants' (dis)use of the scheme, the 25% of tenants using the scheme, and 25% of total data physical memory, nevertheless account for 100% of the metadata allocation and so impose an effective memory overhead of 12 to 13%. Seeing as memory is one of the most expensive resources in a data centre, a 12 to 13% reservation of physical memory is not acceptable.

According to the second approach (on the right hand side), and according to embodiments of the present disclosure, a small (not necessarily contiguous) range of physical memory 110 is reserved for a metadata summary table by making a fixed reservation at boot time. The metadata summary table is stored using $1/512$ of physical memory in some cases. The metadata summary table enables indirection (by storing pointers to locations in the physical memory storing metadata) and enables caching functionality in some cases (where it stores metadata). The metadata summary table is a representation of the physical memory holding information about which regions of the physical memory store metadata, which store data and which are not yet allocated. The metadata summary table itself stores some metadata in certain situations as explained in more detail below and in this respect provides a type of cache function for the metadata it stores. Data is stored in the remaining physical memory 112 and in addition, parts of the remaining physical memory 112 are dynamically allocated for storing metadata. Pointers to the dynamically allocated physical memory regions for storing metadata are stored in the metadata summary table. In this way data and its associated metadata are not stored together in the physical memory i.e. not spatially adjacent. Embodiments of the present technology are concerned with this second approach where a metadata summary table is used. Because the metadata summary table is much smaller than the range of physical memory 106 of the first approach there is a significant memory saving as compared with the first approach. Because the metadata summary table enables indirection by storing pointers to locations in physical memory that store metadata, it is possible to have enough memory to store metadata even though the metadata summary table is much smaller than the range of physical memory of the first approach.

Introducing indirection by use of the metadata summary table brings potential increases in computation burden as compared with the first approach. However, by enabling some caching functionality the burden is mitigated. By storing metadata in the metadata summary table itself in some situations the computation burden is reduced since there is no need to look up a pointer to a location in the physical memory where the metadata is already in the metadata summary table. In examples, where metadata is the same for contiguous regions of the physical memory that metadata is held in the metadata summary table.

In the approaches of FIG. 1 data and metadata are stored separately in physical memory. Other approaches involve storing metadata in band, that is, storing metadata together with its associated data in physical memory. Doing this involves using specialist physical memory that supports metadata directly. However, memory chips which support metadata directly are costly and are not deployed in many current data centers. The inventors have also recognized that using memory chips which support metadata directly does not bring advantages of locality properties which can be exploited to improve performance as explained below. Some operations on metadata benefit from being able to inspect metadata separately from data. Implementing these efficiently with physical memory that stores metadata directly would require that the memory be able to query columns of metadata as well as rows of data and metadata.

Figure 2:
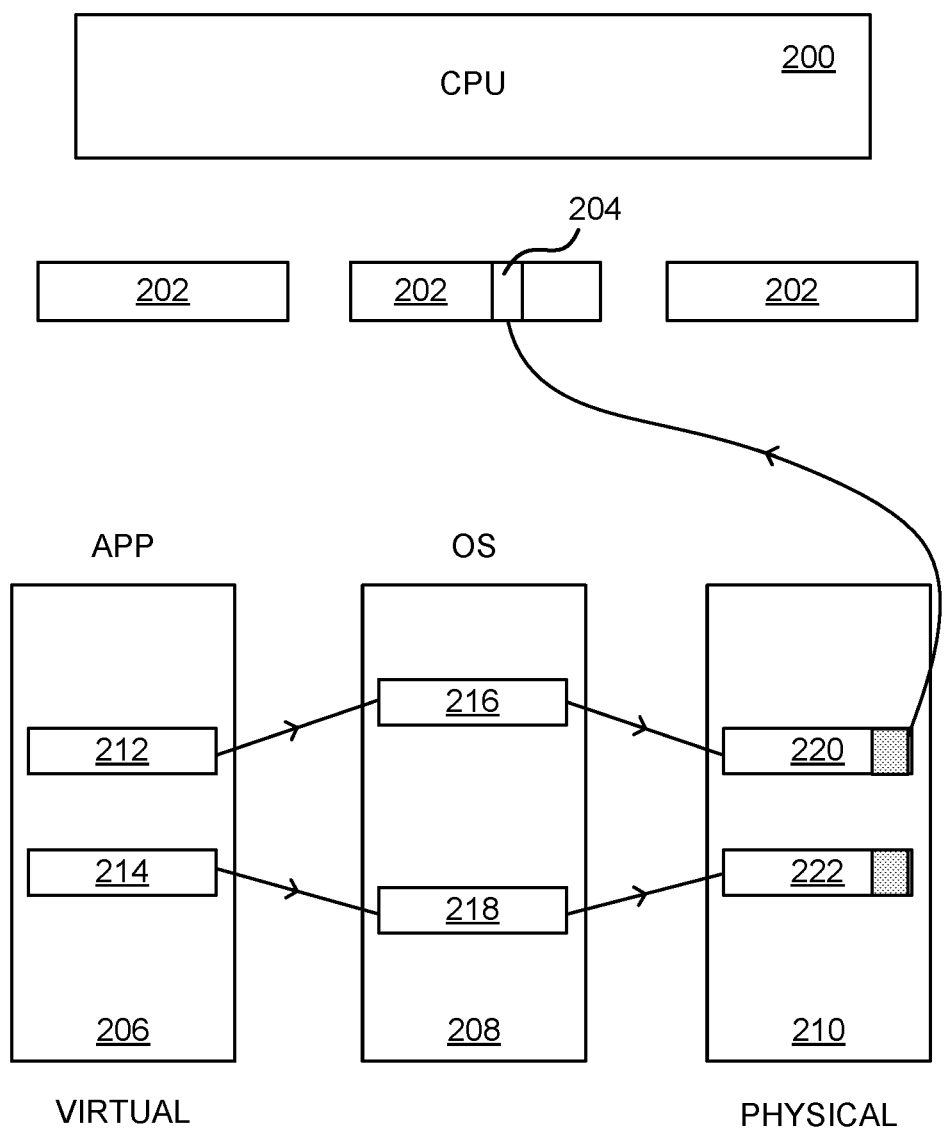
FIG. 2 is a schematic diagram of a central processing unit, cache lines and virtual and physical memory of a computing device, where the physical memory stores data and metadata together.

FIG. 2 is a schematic diagram of a central processing unit 200, cache lines 202 and virtual 206 and physical 210 memory of a computing device, where the physical 210 memory stores data and metadata together. FIG. 2 is background material included to aid understanding of the present disclosure.

Suppose an application (APP in FIG. 2) being executed on a virtual machine on the computing device uses pages of memory 212, 214 allocated in a virtual memory address space 206. The pages of virtual memory 212, 214 are mapped to pages 216, 218 of pseudo physical/guest physical memory 208. In turn the pages 216, 218 of pseudo physical/guest physical memory 208 are mapped to physical memory pages 220, 222. To store metadata the physical memory pages 220, 222 are extended slightly as indicated by the cross hatched rectangles. The metadata is stored in the physical memory 210 and the fact that address translation occurs does not affect ability to find metadata. That is, given a virtual memory address, it is possible to translate the virtual memory address to a physical memory address using conventional address translation methods, and obtain metadata stored in the physical memory with the physical memory page. When data and its associated metadata are retrieved from physical memory and put into a cache line (as indicated by the arrow from physical memory page 220 to cache line chunk 204 in FIG. 2) the data and its metadata flow together and are stored together in the cache line 202. However, this type of approach is not workable since normally there is not enough space for the metadata to be stored together with the data in the physical memory. Embodiments of the present disclosure therefore store data and metadata separately in physical memory.

Figure 3:
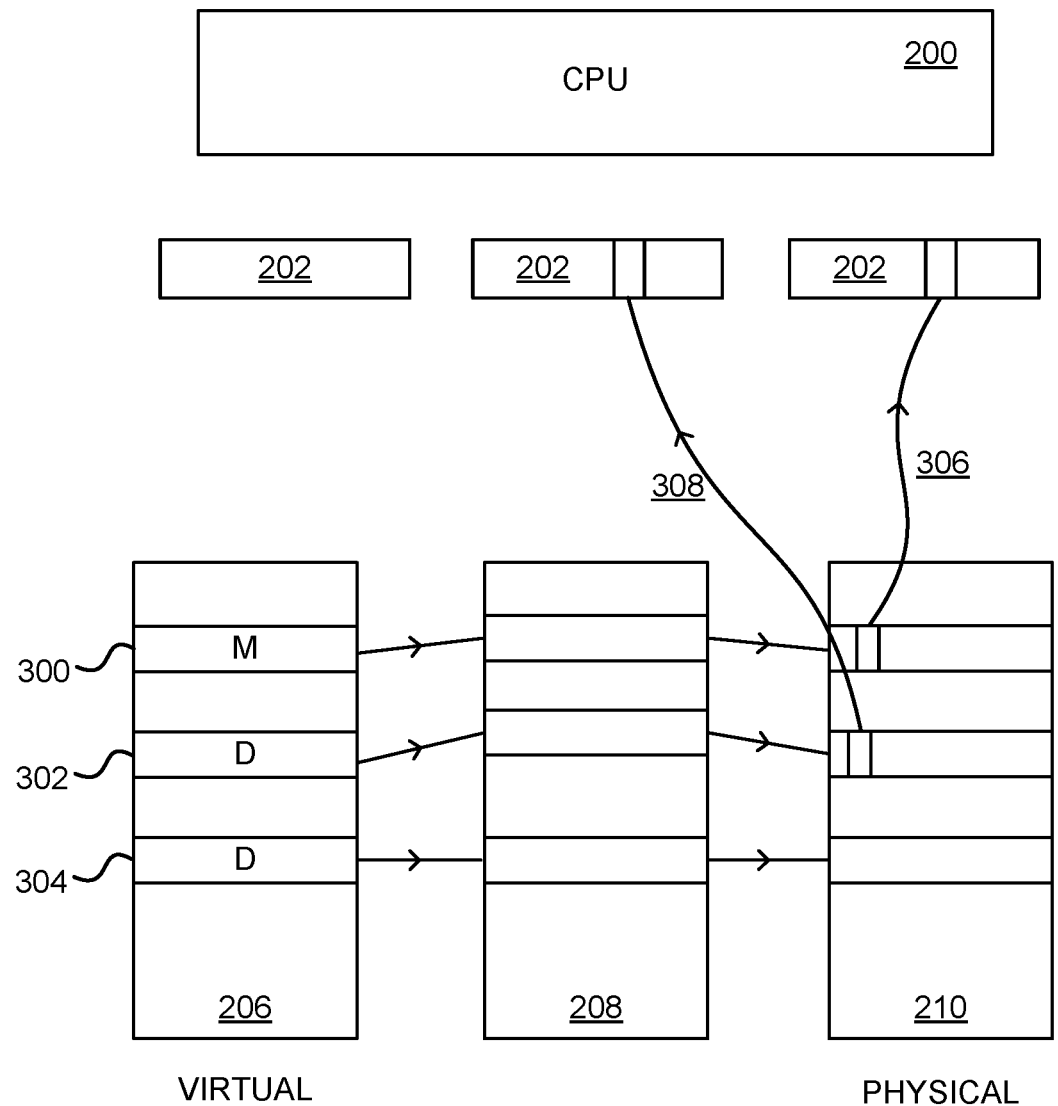
FIG. 3 is a schematic diagram of a central processing unit, cache lines and virtual and physical memory of a computing device, where the physical memory stores data and metadata separately.

FIG. 3 is background material and is included to aid understanding of the present disclosure. FIG. 3 is a schematic diagram of a central processing unit 200, cache lines 202 and virtual 206 and physical 210 memory of a computing device, where the physical 210 memory stores data and metadata separately. FIG. 3 shows one way of avoiding a fixed carve out of physical memory for storing metadata. However, the approach of FIG. 3 has drawbacks as explained below and which are addressed in the present disclosure. By storing the data and metadata separately there is enough space for the metadata. As for FIG. 2 an application is executing in a virtual machine of the computing device and uses virtual memory pages in virtual memory 206. In this example, the virtual memory pages comprise a virtual memory page for metadata only 300, and virtual memory pages for data only 302, 304. As for FIG. 2 each page of the virtual memory is mapped to a page in pseudo physical/guest physical memory 208. As for FIG. 2 each page in pseudo physical/guest physical memory 208 is mapped to a page in physical memory 210. When a cache line fill operation happens, data and its associated metadata are retrieved from separate pages in the physical memory 210 and stored in separate locations in the cache lines 202 as indicated by the arrows 306, 308 between physical memory 210 and cache lines 202 in FIG. 3. Because the data and associated metadata are not stored together in the cache lines 202 subsequent operations on the data and associated metadata are not straightforward. Thus embodiments of the present technology enable data and its associated metadata to be stored together in a cache of the CPU such as cache lines 202 or a hierarchical cache, even where data and metadata are separately stored in physical memory.

Figure 4:
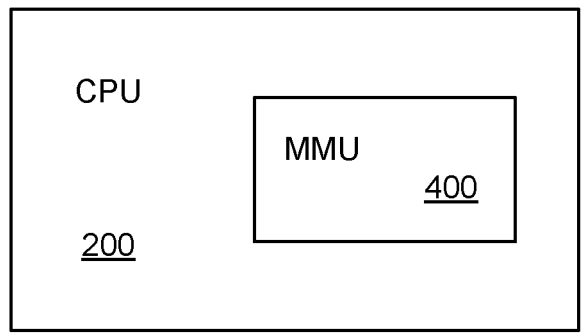
FIG. 4 is a schematic diagram of a memory management unit and a tag controller of a computing device.
Figure 4:
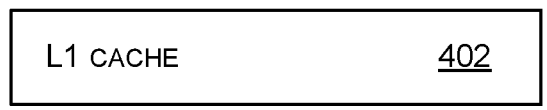
Figure 4:
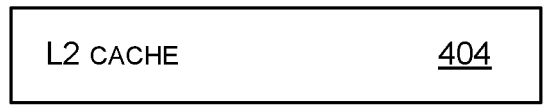
Figure 4:
Figure 4:

FIG. 4 is a schematic diagram of a memory management unit 400 and a tag controller 406 of a computing device according to embodiments of the present disclosure. In various embodiments of the present disclosure functionality to enable the metadata summary table to be updated and used is implemented in the memory management unit 400 and/or tag controller 406. The term "tag" is used to refer to a type of metadata so that the "tag controller" is functionality for controlling metadata. The tag controller is not necessarily working in response to something the CPU is doing at the time. The tag controller carries out cache line evictions or cache fills since it is part of the cache hierarchy. The memory management unit 400 is part of the CPU 200. The CPU communicates with physical memory 210 via a cache which in the example of FIG. 4 is a hierarchical cache comprising a level 1 cache 402, a level 2 cache 404 possible further levels of cache (indicated by the dots in FIG. 4) as well as tag controller 406. Additional layers of cache may also exist between the tag controller 406 and physical memory 210. Data and metadata are stored together in any layers of cache between the tag controller 406 and the CPU 200 and separately in any layers between the tag controller 406 and main memory 210. In embodiments of the present disclosure, the CPU is able to operate as if the data and associated metadata are stored together in physical memory (when in fact they are stored separately). This is achieved through use of the tag controller such that there is a single address in physical memory address space usable to retrieve data and its associated metadata. By using the tag controller as described herein, after address translation there is a single physical address that is used to retrieve data and metadata. Precisely how data and metadata is stored in the physical memory is invisible to the processor and most of the caches.

In the example of FIG. 4 the tag controller is at the bottom of the cache hierarchy immediately following the physical memory 210. Benefits of having the tag controller immediately following the physical memory include simplicity of implementation on some systems.

The computing device of FIG. 4 also has one or more memory controllers which are not shown in FIG. 4 for clarity. The memory controllers communicate directly with the physical memory and thus in some embodiments the tag controller 406 is inside one of the memory controllers. In this case, where the tag controller 406 is inside one of the memory controllers it has a small amount of cache inside the tag controller to store metadata and optionally metadata summary table entries. Benefits of having the tag controller inside a memory controller include providing a single integration point.

In some embodiments the tag controller is immediately before the last level cache and the last level cache stores data and metadata separately (unlike the other cache levels where data and metadata are stored together). Benefits of this approach include dynamically trading between the amount of data and metadata stored in generic caches depending on the workload.

Figure 5:
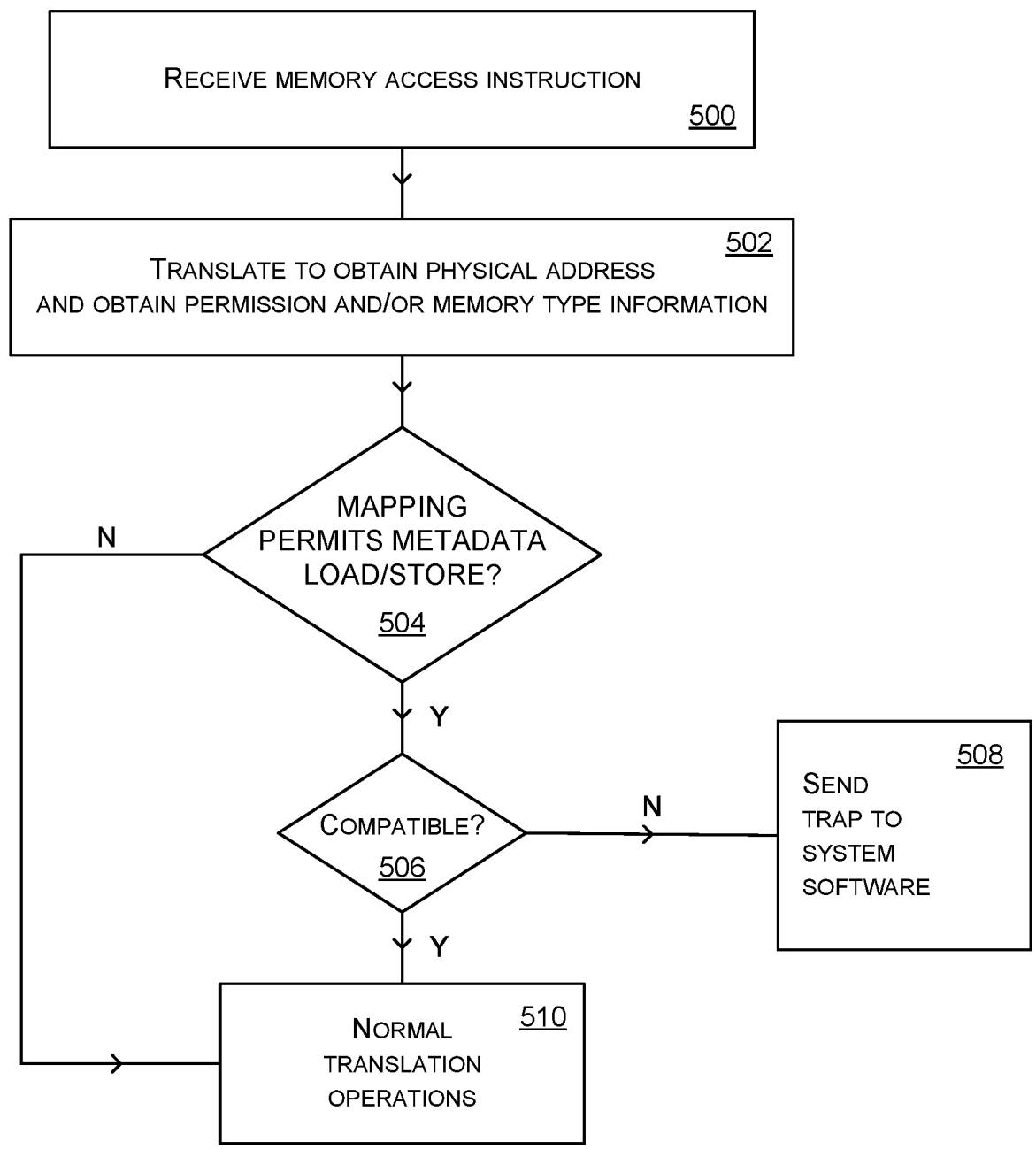
FIG. 5 is a flow diagram of a method performed by a memory management unit.

FIG. 5 is a flow diagram of a method performed by a memory management unit according to embodiments of the present disclosure. The memory management unit has functionality of a conventional memory management unit for translating between virtual memory addresses, pseudo/guest physical memory addresses and physical memory addresses. In addition the memory management unit is extended as now explained. The memory management unit receives 500 a memory access instruction as a result of an application executing at a virtual machine running on the CPU for example. The memory access instruction comprises a virtual memory address. The memory management unit translates 502 the virtual memory address to obtain a physical memory address. As part of the translation process the memory management unit also obtains information which is permission information and/or memory type information. The translation information and permissions are provided by software to the MMU either by explicit instructions or by software maintaining a data structure such as a page table that the MMU can directly consult. The permission information indicates whether permission has been given to store metadata associated with the physical memory address. The memory type information indicates whether a type of the memory at the physical memory address is a type where metadata is potentially associated with the physical memory address.

The memory management unit uses the information it obtained at operation 502 to decide (at operation 504) whether the memory access instruction permits metadata. Responsive to the memory access instruction not permitting metadata the memory management unit proceeds to operation 510 at which it resumes its normal translation operations. In this way processing overhead is unaffected where metadata is not being used, such as where hardware security schemes or other schemes using metadata are not required. This is very useful because it allows a zero-cost feature for virtual machines which don't use metadata storage. In the case of a computing device with hardware that supports metadata and with a virtual machine that does not enable use of the metadata then no address translation will permit metadata.

Responsive to the memory access instruction permitting metadata (at operation 504) the memory management unit proceeds to operation 506. At operation 506 the memory management unit checks whether the memory access instruction is compatible with metadata. This check involves querying the metadata summary table. Responsive to the memory access instruction being compatible with metadata the memory management unit proceeds with normal translation operations 510. Since the memory access instruction is compatible with metadata the physical memory address already has associated metadata storage.

Responsive to the memory access instruction being incompatible with metadata (at operation 506) a trap is sent 508 to system software. A trap is a message or flag which indicates to system software of the computing device that there is a fault. The fault is that the memory access instruction needs metadata storage space in physical memory but there is currently none allocated. The trap permits or enables or triggers the system software to dynamically allocate space in physical memory for storing metadata for the memory access instruction. Having the memory management unit send the trap is beneficial in that the memory management unit is operating generally in synchrony with the central processing unit. In contrast, the tag controller is not in synchrony with the central processing unit. Thus the inventors have recognized that using the memory managing unit rather than the tag controller to generate the traps is beneficial; since generating the traps at the tag controller would likely lead to situations where the software attempting to allocate metadata space would trigger more cache evictions and make forward-progress guarantees very difficult.

It is noted that in FIG. 5 there are two decision diamonds 504, 506 and this brings benefits as opposed to having a single decision diamond. If decision diamond 504 is omitted the process is workable. In the case of a single decision diamond it is inferred that metadata is permitted (i.e. decision diamond 504) from the fact that storage has already been allocated for metadata (compatibility check 506). But in this case the metadata summary table has to be visible to the CPU or at least to the MMU which is problematic. Also, there is not enough information available in the case of a single decision diamond to enable distinction to be made between different types of metadata scheme being used in the data centre. Suppose some virtual machines in the data centre are using MTE only, some CHERI only, some CHERI and MTE then just the fact that some metadata storage is available is not enough to tell whether a particular kind of metadata can be stored for a given page. Note that the term "page" refers to a unit of memory which is not necessarily the same as a unit of memory referred to as a page used by the MMU.

FIG. 5 illustrates how instructions executed on a computing device cause a memory management unit, responsive to the permission information indicating that metadata is not permitted at the physical memory address, to proceed with translation operations.

FIG. 5 illustrates how instructions on a computing device cause a memory management unit, responsive to checking the metadata summary being successful, to proceed with translation operations.

Figure 6:
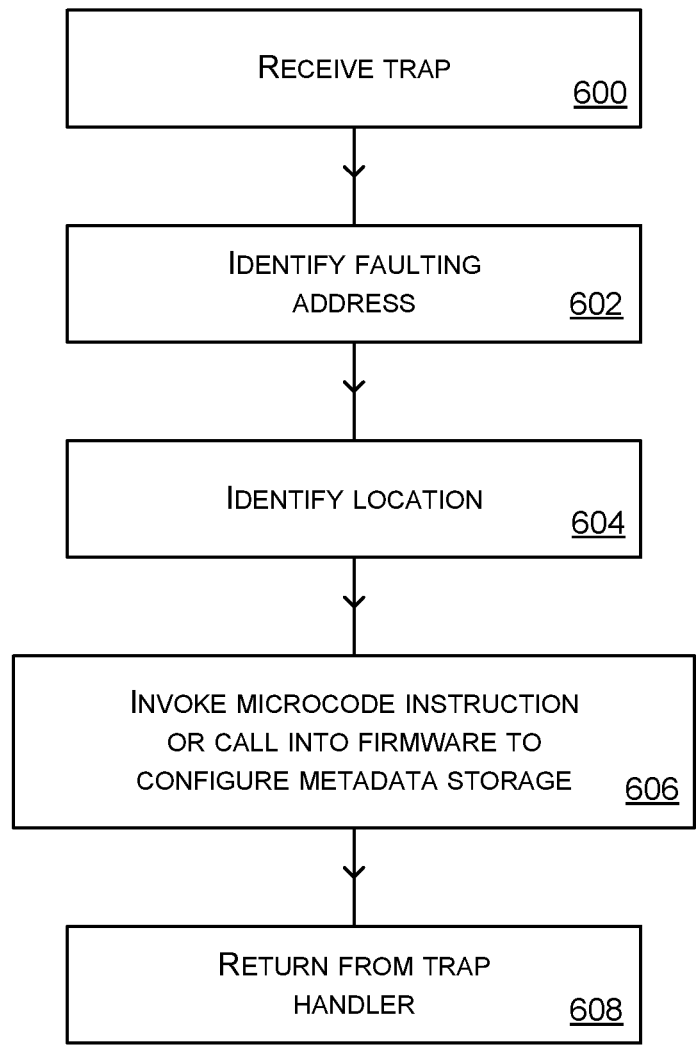
FIG. 6 is a flow diagram of a method performed by system software.

FIG. 6 is a flow diagram of a method performed by system software at the computing device according to embodiments of the present disclosure. A non-exhaustive list of examples of system software is: operating system, hypervisor. The system software receives 600 a trap as a result of operation 508 of FIG. 5. The system software identifies 602 a faulting address associated with the trap by examining information received in the trap. The faulting address is a physical memory address which was investigated as a result of the memory access instruction of FIG. 5 and was found to have no associated metadata storage even though the memory access instruction needs associated metadata storage. The system software identifies 604 a location in physical memory which is available to be allocated for metadata storage. The system software invokes 606 one or more instructions or makes a call into firmware of the computing device to configure metadata storage. The system software may communicate either explicitly or implicitly with systems software in other trust domains during this process. During the configuration the microcode or firmware allocates the identified location in physical memory for metadata storage. This involves marking a new page for use as metadata storage or involves using a new slot on an existing page. The microcode or firmware performs checks to determine whether the identified location can be used for metadata storage for a specified data page within the hardware security scheme or other scheme that the metadata is being used for.

The system software returns 608 from the trap handler and thus the memory management unit is made aware that the trap has been handled. The MMU then retries the memory access instruction i.e. it repeats the process of FIG. 5 from operation 500. This time when the MMU reaches operation 506 the outcome is successful since metadata storage has been allocated and the MMU is able to proceed to operation 510.

FIG. 6 shows how the system software comprises instructions for
  receiving the trap from the memory management unit;
  identifying a faulting address which is the physical memory address;
  identifying a memory location for storing metadata associated with the physical memory address; and
  using microcode or firmware to configure the identified memory location for storing the metadata.

FIG. 6 shows how the system software comprises instructions for, responsive to successful configuration of the identified memory location for storing the metadata, indicating to the memory management unit to continue with translation operations.

Figure 7:
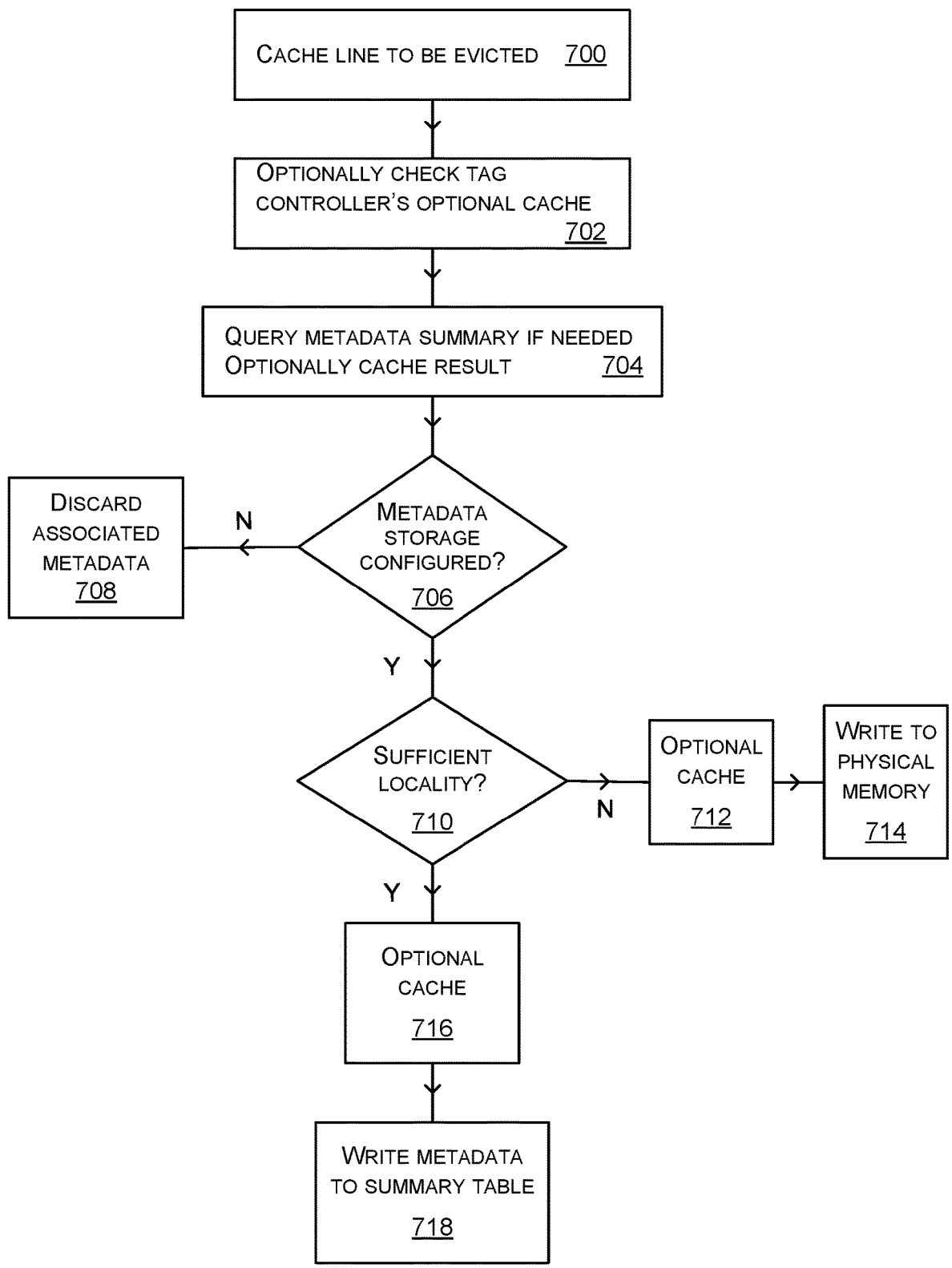
FIG. 7 is a flow diagram of a method performed by a tag controller for cache line eviction.

FIG. 7 is a flow diagram of a method according to embodiments of the present disclosure. The method of FIG. 7 is performed by a tag controller for cache line eviction where a cache line is to be evicted to a lower level cache or to physical memory. In the case where a cache line is to be evicted to a lower level cache, that lower level cache is one which stores data and metadata separately. As explained earlier the tag controller is part of the cache hierarchy and is responsible for eviction of cache lines from its part of the cache hierarchy as well as cache fills to its part of the cache hierarchy. The tag controller optionally has its own internal cache referred to here as the tag controller's internal cache. When a cache line is to be evicted 700, the tag controller checks 702 its own internal cache to find out whether there is metadata storage configured for a location in physical memory or the lower level cache to which the cache line contents are to be evicted. If the results from the internal cache are inconclusive, the tag controller queries 704 the metadata summary table to find out whether there is metadata storage configured. The tag controller optionally caches the result of the query to the metadata summary table in its internal cache in cases where it has an internal cache.

The tag controller is thus able to determine 706 whether metadata storage is configured for a location to which the cache line contents are to be evicted. Responsive to metadata storage not being configured the tag controller proceeds to discard 708 the metadata in the cache line that is being evicted.

Responsive to metadata storage being configured at decision diamond 706 the tag controller checks 710 whether the metadata in the cache line to be evicted has sufficient locality. Sufficient locality is where metadata is the same within relatively close storage locations. The cache line is made up of a plurality of chunks of data in series and each chunk may have an item of metadata stored with the chunk in the cache line (since in the cache line metadata and data are stored together). If the metadata is the same for a plurality of consecutive chunks there is sufficient locality. The tag controller inspects the metadata of the chunks to see if there are more than a threshold number of consecutive chunks which have the same metadata. The threshold is set in advance and depends on the amount of space available in the summary table.

Where there is not sufficient locality of the metadata in the cache line, the tag controller proceeds to write 714 out the metadata to physical memory. The data from the cache line being evicted is also written out to physical memory. Since in physical memory the data and metadata are stored separately, the metadata is written to a different location in physical memory from the data. The tag controller optionally stores the metadata associated with the cache line in its internal cache at 712 (or else must write it to physical memory or a lower level cache). Over time metadata accumulates in the internal cache of the tag controller and once the internal cache is full the tag controller writes the metadata back to physical memory. In this way the frequency of writes to the physical memory is reduced.

Where there is sufficient locality of the metadata in the cache line, the tag controller writes 718 the metadata in condensed form to the metadata summary table. Suppose the metadata for each chunk in the cache line is the same. In this case the metadata written to the metadata summary table is one instance of the metadata for a single chunk and an indication that the same metadata applies for the whole cache line. The condensed form of the metadata is a value of the metadata and a range of memory locations over which the metadata value applies. The tag controller optionally uses 716 its internal cache to accumulate metadata in condensed form before writing the condensed form metadata to the metadata summary table. The metadata cache and compression act to reduce accesses (both reads and writes) to metadata storage in physical memory. In various examples there is caching of both the metadata summary table and metadata.

The inventors have recognized that the sufficient locality check at operation 710 of FIG. 7 provides useful performance benefits. Examples of locality properties of MTE and CHERI are now given. MTE and CHERI both have the same underlying demand from the memory system: they store out-of-band data that is carried through the cache hierarchy. MTE uses four bits per 16-byte granule to store the metadata. CHERI uses one bit per 16-byte granule to indicate whether the data is a valid capability. Both forms of metadata have useful locality properties:

MTE metadata are the same for every granule in an allocation and so large allocations have contiguous runs of the same metadata value. This is particularly true of large file mappings where entire pages will have the same metadata value.

Most programs contain large amounts of contiguous non-pointer data and so CHERI systems have long runs of data with a not-valid tag-bit value. These can also cover entire pages.

FIG. 7 illustrates use of a tag controller, the tag controller being part of a cache hierarchy of the computing device, the tag controller being arranged to take into account metadata during cache line evictions and/or cache fills of at least part of the cache hierarchy.

FIG. 7 boxes 700, 702, 704 show how the tag controller is arranged to, as part of a cache line eviction, determine whether metadata storage is configured for a physical memory address to which the cache line is to be evicted, by checking one or more of: a cache of the tag controller, the metadata summary table.

FIG. 7 diamond 706 negative outcome shows how the tag controller is arranged to, responsive to finding the metadata storage is not configured, to discard metadata of the cache line being evicted.

FIG. 7 diamond 710 shows how the tag controller is arranged to, responsive to finding the metadata storage is configured, check whether metadata of the cache line being evicted has sufficient locality, and responsive to sufficient locality being found, write the metadata of the cache line being evicted to the metadata summary table; and responsive to sufficient locality not being found, write the metadata to the physical memory.

Figure 8:
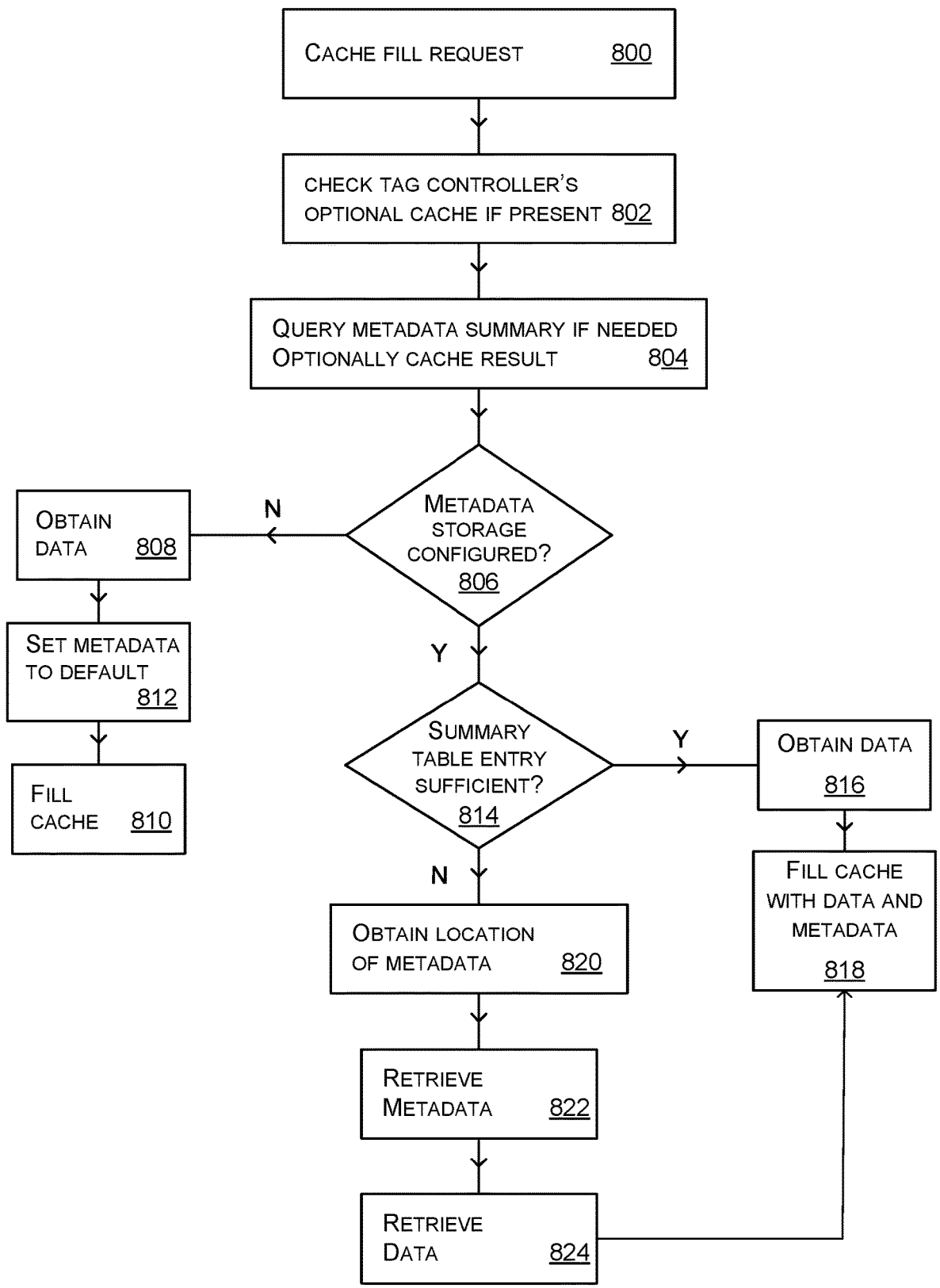
FIG. 8 is a flow diagram of a method performed by a tag controller for cache fill.

FIG. 8 is a flow diagram of a method performed by a tag controller for cache fill according to embodiments of the present disclosure. The cache being filled is one which stores metadata and data together. The tag controller receives 800 a cache fill request from a higher level cache in the cache hierarchy. The cache fill request comprises a physical memory address from which it is desired to obtain data to fill the cache. The tag controller checks 802 its own internal cache (where it has an internal cache available) to find out whether or not there is metadata storage configured for the physical memory address. If the results are inconclusive (i.e. the metadata is not found in the internal cache) the tag controller queries 804 the metadata summary table and optionally caches the result in its internal cache. Since the metadata summary table has knowledge of the physical memory and whether metadata is configured or not for units of the physical memory.

At decision diamond 806 the tag controller is in a position to decide whether metadata storage has already been configured for the physical memory address (using the information obtained at operations 802 and 804). If not, the tag controller obtains 808 data from the physical memory. The tag controller then sets 812 metadata associated with the data in the cache to a default value. In the cache data and metadata are stored together. Since the data in this case has no associated metadata the tag controller fills the metadata region for each chunk in the cache with a default value. The tag controller then fills 810 the cache. If caches support tracking the validity of data and metadata independently then the tag controller may provide the data and metadata as soon as they are available rather than combining them into a single message.

At decision diamond 806, where it is determined that metadata storage is configured for the physical memory address, the tag controller proceeds to decision diamond 814. At decision diamond 814 the tag controller examines the metadata summary table entry for the physical memory address to see whether the metadata summary table entry has sufficient information. If so, the metadata summary table entry contains the metadata. The tag controller proceeds to obtain 816 the data from the physical memory address and to append the metadata to the data. The tag controller then fills 818 the cache with the data and appended metadata.

At decision diamond 814, where the metadata summary table entry does not already contain the metadata, the metadata summary table entry comprises a pointer to a location in physical memory where the metadata is stored. The tag controller thus obtains 820 the location in physical memory where the metadata is stored and retrieves 822 the metadata. The tag controller also retrieves 824 the data from physical memory (as the data is stored in physical memory separately from the metadata), appends the metadata to the data and fills 818 the cache with the data and appended metadata.

FIG. 8 boxes 800, 802, 804 illustrate how the tag controller is arranged, as part of a cache fill of the cache hierarchy, to determine whether metadata storage is configured for a physical memory address from which data is to be written to the cache hierarchy, by checking one or more of: a cache of the tag controller, the metadata summary table.

FIG. 8 diamond 806 negative outcome illustrates how the tag controller is arranged, responsive to finding the metadata storage is not configured, to fill the cache of the cache hierarchy with the data and with metadata where the metadata is set to a default value.

FIG. 8 diamond 814 positive outcome illustrates how the tag controller is arranged, responsive to finding the metadata storage is configured, to check the metadata summary table, and responsive to relevant metadata being found in the metadata summary table, filling the cache hierarchy with the data and the relevant metadata.

FIG. 8 diamond 814 negative outcome illustrates how the tag controller is arranged, responsive to finding the metadata storage is configured, to check the metadata summary table, and responsive to relevant metadata not being found in the metadata summary table, obtaining a location of the relevant metadata in physical memory from the metadata summary table.

The methods described above with reference to FIGS. 7 and 8 enable compression of long runs of the same metadata and provision of a fast path for cases where, for example, metadata is uniform across an entire page. Caching such runs of metadata within the tag controller can eliminate many reads to physical memory; in fact, for pages where system software guarantees uniformly metadata, the finer-grained metadata store can be completely elided. With CHERI, opportunistically compressing a run of zeroed metadata is additionally useful to system software sweeping memory for capabilities: no metadata capability data needs to be retrieved from memory for such runs.

The embodiments described herein enable dynamically allocated, hierarchical metadata storage, which allows storage to be tailored on a VM-by-VM basis or application-by-application basis.

In some embodiments described herein the computing device has a policy for metadata storage. In examples, a policy for metadata storage is managed by an operating system kernel of the computing device in a non-virtualized system, a hypervisor in a virtualized system, and the hypervisor in combination with privileged microcode or firmware in a system with fuzzy privilege boundaries and conventional virtualization. In embodiments where the computing device implements confidential computing, the mechanism for metadata storage is implemented in privileged firmware or microcode. In the presence of any confidential computing system that removes the hypervisor from the trusted computing base for confidentiality or integrity, the privileged firmware or microcode is arranged to prevent any entity in the system from inspecting or modifying metadata for pages where it may not also modify the data. In systems without support for confidential computing then other systems software such as the operating system (OS) or hypervisor may be trusted to maintain the same guarantee.

In embodiments where the computing device implements confidential computing, the metadata summary table is managed by privileged firmware or microcode and its layout does not need to be architecturally exposed outside of the privileged firmware or microcode. There is a trivial mapping from any physical address to the corresponding entry in the metadata summary table. In a system that provides confidential computing support then the metadata summary table information that the MMU uses may be stored in the same place as reverse mappings or similar metadata for confidential computing. In this way no extra memory accesses for the MMU are needed.

There is a coherence point in the cache and memory system below which metadata and data are stored separately and above which they flow around merged into single cache lines. The tag controller is responsible for assembling data and metadata on loads, splitting them on evictions, and maintaining a cache of metadata values.

The embodiments described herein give the benefit of "You don't pay for what you don't use." Sizable memory carveouts exist only for VMs using architectural features necessitating reserved physical memory; the carveout is not larger than required by the specific features requested.

The embodiments described herein give the benefit that the (micro)architecture is as simple as possible in the interest of achieving high performance.

In examples using confidential computing, the hypervisor or microcode or firmware is arranged to ensure that metadata storage is not removed from a page while it may still have metadata in the cache. If a metadata page is removed from physical memory, the corresponding data page will also have been removed and so any stale data in the cache is safe to discard. It is the responsibility of the microcode or firmware to ensure that such data is flushed from the cache before returning a metadata page to an untrusted hypervisor, just as it does when returning a data page to insecure memory regions.

In examples using confidential computing, there is a software interface to privileged firmware or microcode as now described. The software interface comprises function calls which act across a privilege boundary.

Privileged firmware or microcode exposes a small number of functions that manage the metadata summary table and the metadata that it points to. The metadata summary table can be thought of as a contract between the hardware and the firmware: it is read by both the tag controller and the MMU and maintained by the firmware. The tag controller may also write to the metadata summary table to store metadata as the top level in a hierarchical tag storage design. System software on top of the firmware has a consistent interface to the firmware that does not expose the implementation details of the metadata summary table.

Each metadata page is logically treated as an array of metadata stores, one metadata store per data page. The number of metadata stores in a single metadata page depends on the supported features. If a VM has metadata-using features globally disabled then the MMU is able to completely skip the checks for metadata storage. This means that the hypervisor commits to either provisioning metadata storage when each page is assigned to the VM, or lazily dynamically assigning fine-grained metadata storage for a page once the VM maps it as a metadata page.

The hypervisor may still overprovision memory if desirable. For example, a cloud provider may add the 3.125% of memory assigned to normal VMs with MTE enabled to the pool available for other VMs and reclaim it when metadata storage for those pages is desired. On a physical machine with 1 TiB of memory, if all VMs have MTE enabled but use it for only half of their pages, this leaves 16 GiB of memory that may be temporarily used for other VMs, as long as it can be reclaimed by the hypervisor when catching the fault.

In various embodiments a computing device comprises a privilege boundary, and instructions executed on a side of the boundary which is more trusted expose a plurality of functions across the privilege boundary for managing one or more of: the metadata summary table and metadata that the metadata summary table points to.

In an example one of the plurality of functions: takes a physical page address and a set of metadata features as arguments and returns true if the page may be used for metadata storage and false otherwise, where a page is a unit of memory the same or different from a unit of memory used by the memory management unit; or creates a mapping between a data page and a metadata storage slot such that confidential computing guarantees of a host architecture are met; or detaches data pages from an associated metadata page.

In an example one of the plurality of functions handles transition of a page from metadata storage to data storage use, such that where a page is transitioned over a privilege boundary the page is not used for metadata storage.

Querying Metadata Size

A particular implementation may need to reserve different amounts of storage for different microarchitectural features and this may be more than the amount of architectural state. In an example some VMs in the data center use MTE and some use CHERI. In this case it is useful to have a function to query the firmware or microcode to find out how much space is necessary for metadata storage (since that will vary according to whether MTE or CHERI is being used). In an example the function takes as arguments an indication of types of metadata (e.g. MTE or CHERI) to be stored for a given page.

Creating a Metadata Page

In an example, the privileged firmware or microcode exposes a function for transferring a page from being a data page to being a metadata page. In the case of confidential computing, the function for creating a metadata page is arranged to keep the data page in the appropriate privilege level so that the confidential computing is not breached. The function takes as argument a physical page address and returns true or false depending on whether the physical page is successfully transferred to a page for storing metadata.

Before some physical memory can be used to store metadata, it is moved from the generally available pool of physical memory using this function.

In the case of confidential computing, the firmware checks that the page passed as the argument to this function is owned by the caller's privilege level.

Assigning Metadata Storage for a Page

In an example, the privileged firmware or microcode exposes a function for assigning metadata storage for a page.

Each data page that will have associated metadata has a metadata storage slot associated with it. A metadata storage slot is a unit of physical memory within a page for storing metadata. A function is used to create that mapping. In an example the function takes a physical address of a data page as an argument. Another argument is a physical address of a page assigned to store metadata. Another argument is an index or address of available slots in the metadata page.

This function performs sufficient checks so that it enforces any confidential computing guarantees of the host architecture. The function returns true if metadata storage is successfully assigned for the page. Otherwise the function returns false. The function will return failure if the metadata or data pages are not owned by the caller, if the metadata page is not a metadata page, or if the data page already has metadata assigned.

If there are no errors, then the metadata summary table entry for the data page is updated to point to the specified slot in the given metadata page. The metadata summary table state associated with the metadata page is also updated to store at least enough metadata to prevent metadata pages being released while still referenced from data pages.

Removing Metadata Storage from a Data Page

In an example, the privileged firmware or microcode exposes a function for removing metadata storage from a data page.

Before a metadata page can be reclaimed for normal use, data pages using it to store metadata are detached using a function for removing metadata storage from a data page. The caller of this function removes the data page from any translation tables and invalidates cache lines that contain data from it. This ensures that there are no cache lines containing metadata above the tag controller.

The function for removing metadata storage from a data page takes as an argument the data page physical address and returns a value indicating success or failure. If the data page is not owned by the caller, is not a data page, or is a data page without metadata assigned to it, then the function will return failure.

If a call to the function succeeds, then the metadata summary table entry for the data page is reset to indicate no metadata and any book-keeping state associated with the metadata page is updated to reflect the fact that this reference has gone away. The firmware invalidates any cache lines that refer to this data page.

Querying Metadata Storage for a Data Page

In an example, the privileged firmware or microcode exposes a function for querying metadata storage for a data page.

This function takes the data page physical address as the argument and returns a value indicating success or failure.

If the data page is not owned by the caller, is not a data page, or does not have metadata associated with it, then this function will return failure.

Reclaiming a Metadata Page

In an example, the privileged firmware or microcode exposes a function for reclaiming a metadata page.

Dynamic metadata storage is intended to allow the system software to move memory between data and metadata use and vice versa. This function handles the transition of a page from metadata storage to data storage use.

This function takes a physical address of a metadata page as an argument and returns true if the page has been removed, false otherwise.

This function performs sufficient checks so that it enforces any confidential computing guarantees of the host architecture.

Figure 9:
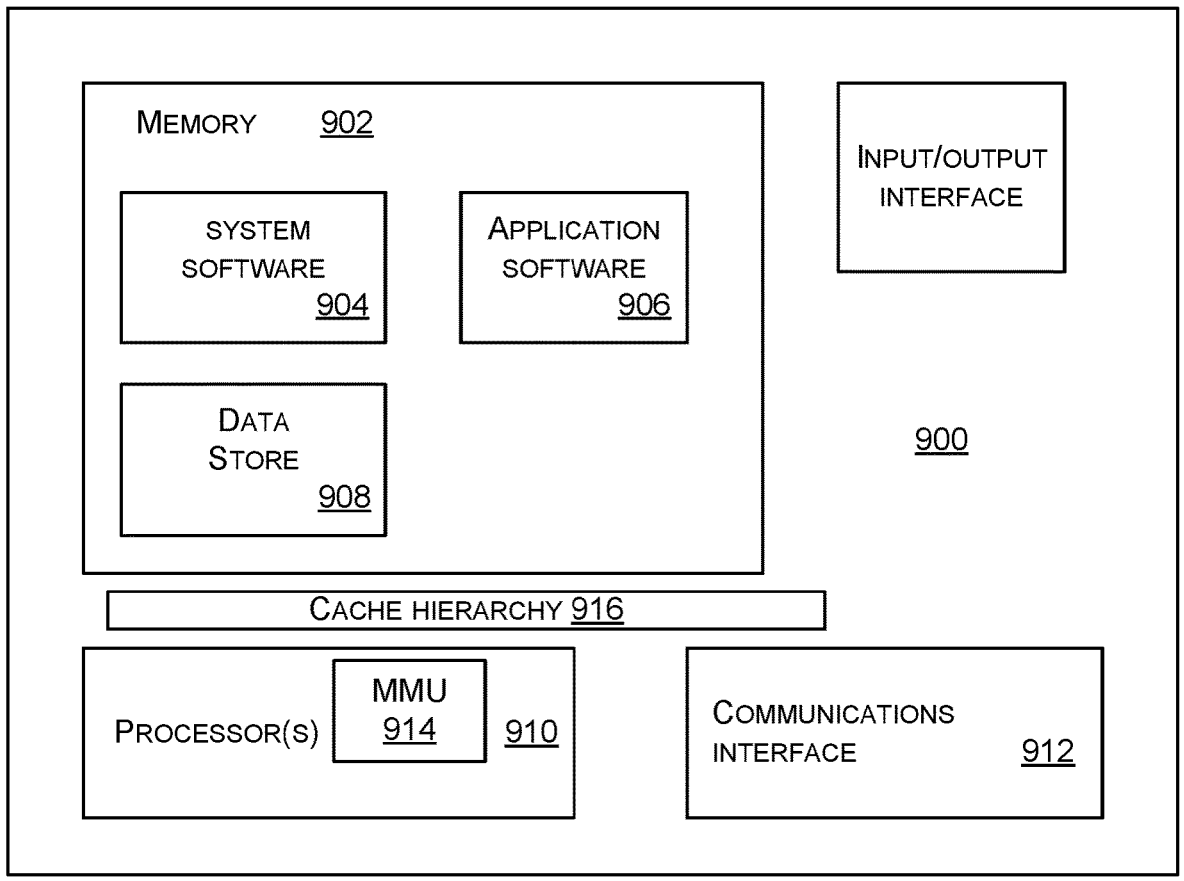
FIG. 9 illustrates an exemplary computing-based device in which embodiments are implemented.

FIG. 9 illustrates various components of an exemplary computing-based device 900 which are implemented as any form of a computing and/or electronic device such as a mobile phone, data centre compute node, desktop personal computer, wearable computer, and in which embodiments of dynamically allocatable metadata storage are implemented in some examples.

Computing-based device 900 comprises one or more processors 910 which are microprocessors, controllers or any other suitable type of processors for processing computer executable instructions to control the operation of the device in order to dynamically allocate metadata storage. The processor has a memory management unit 914. In some examples, for example where a system on a chip architecture is used, the processors 910 include one or more fixed function blocks (also referred to as accelerators) which implement a part of the method of any of FIGS. 5 to 8 in hardware (rather than software or firmware). A cache hierarchy 916 comprises a tag controller (not shown in FIG. 9). System software 904 is provided at the computing-based device to enable application software 906 to be executed on the device.

The computer executable instructions are provided using any computer-readable media that is accessible by computing based device 900. Computer-readable media includes, for example, computer storage media such as memory 902 and communications media. Computer storage media, such as memory 902, includes volatile and non-volatile, removable and non-removable media implemented in any method or technology for storage of information such as computer readable instructions, data structures, program modules or the like. Computer storage media includes, but is not limited to, random access memory (RAM), dynamic random-access memory (DRAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 902) is shown within the computing-based device 900 it will be appreciated that the storage is, in some examples, distributed or located remotely and accessed via a network or other communication link (e.g. using communication interface 912).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed; or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computing device comprising:
a processor, the processor having a memory management unit; and
a memory that stores instructions that, when executed by the processor, cause the memory management unit to:
receive a memory access instruction comprising a virtual memory address;
translate the virtual memory address to a physical memory address of the memory, and obtain information associated with the physical memory address, the information including permission information and/or memory type information, the permission information indicating whether permission has been given to store metadata associated with data in the physical memory address, the memory type information indicating whether the metadata is associated with the physical memory address;
determine that the obtained information indicates that the metadata is permitted to be associated with the physical memory address;
based on the determination that the metadata is permitted to be associated with the physical memory address, query a metadata summary table stored in physical memory, the metadata summary table enabling indirection by storing pointers to locations in the physical memory storing metadata;
based on the querying the metadata summary table storing the pointers, determine whether the metadata is compatible with the physical memory address based on the physical memory address being configured to store metadata; and
upon determining that the metadata is incompatible, send a trap to system software of the computing device, the trap triggering dynamic allocation of the physical memory for storing the metadata associated with the physical memory address; and
use a tag controller, the tag controller being part of a cache hierarchy of the computing device, the tag controller being configured to perform cache line evictions and/or cache fills of at least part of the cache hierarchy based on the metadata,
wherein the tag controller is configured to, as part of a cache line eviction, determine that metadata storage is configured for a physical memory address to which the cache line is to be evicted by checking a cache of the tag controller and/or the metadata summary table,
wherein the tag controller is configured to check whether metadata of the cache line being evicted is the same in a threshold number of consecutive chunks, and upon the metadata being the same in the threshold number of consecutive chunks, write the metadata of the cache line being evicted to the metadata summary table, and upon the metadata not being the same in the threshold number of consecutive chunks, write the metadata to the physical memory.

2. The computing device of claim 1 where the instructions cause the memory management unit, upon the obtained information indicating that the metadata is not permitted at the physical memory address, to proceed with translation operations.

3. The computing device of claim 1 where the instructions cause the memory management unit, upon determining that the metadata is compatible, to proceed with translation operations.

4. The computing device of claim 1 where the memory stores the system software for execution on the processor, the system software comprising instructions for:
receiving the trap from the memory management unit;
identifying a faulting address which is the physical memory address found to have no associated metadata storage even though the memory access instruction needs associated metadata storage;
identifying a memory location for storing the metadata associated with the physical memory address; and
using microcode or firmware to configure the identified memory location for storing the metadata.

5. The computing device of claim 4, where the system software comprises instructions for, upon successful configuration of the identified memory location for storing the metadata, indicating to the memory management unit to continue with translation operations.

6. The computing device of claim 1 comprising a cache hierarchy and wherein the physical memory stores the data and the associated metadata separately and wherein the cache hierarchy stores the data and the associated metadata together.

7. The computing device of claim 1 wherein the tag controller is any of: part of a memory controller of the computing device, located immediately before a last level cache of the cache hierarchy where the last level cache stores data and metadata separately, between a last level cache of the cache hierarchy and the memory controller of the computing device.

8. The computing device of claim 1 wherein the tag controller is arranged to, upon finding the metadata storage is not configured, discard metadata of the cache line being evicted.

9. The computing device of claim 1 wherein the tag controller is arranged to, as part of a cache fill of the cache hierarchy, determine whether metadata storage is configured for a physical memory address from which data is to be written to the cache hierarchy, by checking a cache of the tag controller and/or the metadata summary table.

10. The computing device of claim 9 wherein the tag controller is arranged to, upon finding the metadata storage is not configured, fill the cache of the cache hierarchy with the data and the metadata where the metadata is set to a default value.

11. The computing device of claim 9 wherein the tag controller is arranged to, upon finding the metadata storage is configured, check the metadata summary table, and upon relevant metadata being found in the metadata summary table, filling the cache hierarchy with the data and the relevant metadata.

12. The computing device of claim 9 wherein the tag controller is arranged to, upon finding the metadata storage is configured, check the metadata summary table, and upon relevant metadata not being found in the metadata summary table, obtaining a location where the relevant metadata is stored in the physical memory using a pointer, the pointer being stored in the metadata summary table.

13. The computing device of claim 1 comprising a privilege boundary, and wherein instructions executed on a side of the privilege boundary which is more trusted expose a plurality of functions across the privilege boundary for managing the metadata summary table and/or the metadata that the metadata summary table points to.

14. The computing device of claim 13 wherein one of the plurality of functions: takes a physical page address and a set of metadata features as arguments and returns true if a page may be used for metadata storage and false otherwise, where the page is a unit of memory the same or different from a unit of memory used by the memory management unit; or
creates a mapping between a data page and a metadata storage slot such that confidential computing guarantees of a host architecture are met; or
detaches data pages from an associated metadata page.

15. The computing device of claim 13 wherein one of the plurality of functions handles transition of a page from metadata storage to data storage use, the page being transitioned over the privilege boundary when the page is not used for metadata storage.

16. A computer storage medium storing executable instructions that, when executed by a computing system, direct the computing system to perform operations comprising:
receiving a memory access instruction comprising a virtual memory address;
translating the virtual memory address to a physical memory address of a physical memory;
obtaining permission information and memory type information associated with the physical memory address, the permission information indicating whether permission has been given to store metadata associated with data at the physical memory address, the memory type information indicating whether the metadata is associated with the physical memory address;
determining that the obtained permission information and the memory type information indicates that the metadata is permitted to be associated with the physical memory address;
determining, by querying a metadata summary table stored in the physical memory, whether the metadata is compatible with the physical memory address based on the physical memory address being configured to store metadata, the metadata summary table enabling indirection by storing pointers to locations in the physical memory storing metadata;
based on the determination that the metadata is incompatible, sending a trap to system software of a computing device, the trap triggering dynamic allocation of the physical memory for storing the metadata associated with the physical memory address; and
using a tag controller, the tag controller being part of a cache hierarchy of the computing device, the tag controller being configured to perform cache line evictions and/or cache fills of at least part of the cache hierarchy based on the metadata,
wherein the tag controller is configured to, as part of a cache line eviction, determine that metadata storage is configured for a physical memory address to which the cache line is to be evicted by checking a cache of the tag controller and/or the metadata summary table,
wherein the tag controller is configured to check whether metadata of the cache line being evicted is the same in a threshold number of consecutive chunks, and upon the metadata being the same in the threshold number of consecutive chunks, write the metadata of the cache line being evicted to the metadata summary table, and upon the metadata not being the same in the threshold number of consecutive chunks, write the metadata to the physical memory.

17. A method comprising:
using a memory management unit of a processor to:
receive a memory access instruction comprising a virtual memory address;
translate the virtual memory address to a physical memory address of a physical memory, and obtain permission information and memory type information associated with the physical memory address, the permission information indicating whether permission has been given to store metadata associated with data in the physical memory address, the memory type information indicating whether the metadata is associated with the physical memory address;
determine that the obtained permission information and the memory type information indicates that the metadata is permitted to be associated with the physical memory address;
determine, by querying a metadata summary table stored in the physical memory, whether the metadata is compatible with the physical memory address based on the physical memory address being configured to store metadata, the metadata summary table enabling indirection by storing pointers to locations in the physical memory storing metadata;
upon determining that the metadata is incompatible, send a trap to system software of a computing device, the trap triggering dynamic allocation of the physical memory for storing the metadata associated with the physical memory address; and
using a tag controller, the tag controller being part of a cache hierarchy of the computing device, the tag controller being configured to perform cache line evictions and/or cache fills of at least part of the cache hierarchy based on the metadata,
wherein the tag controller is configured to, as part of a cache line eviction, determine that metadata storage is configured for a physical memory address to which the cache line is to be evicted by checking a cache of the tag controller and/or the metadata summary table,
wherein the tag controller is configured to check whether metadata of the cache line being evicted is the same in a threshold number of consecutive chunks, and upon the metadata being the same in the threshold number of consecutive chunks, write the metadata of the cache line being evicted to the metadata summary table, and upon the metadata not being the same in the threshold number of consecutive chunks, write the metadata to the physical memory.

18. The method of claim 17 further comprising causing the memory management unit, based on the obtained information indicating that the metadata is not permitted at the physical memory address, to proceed with translation operations.

19. The method of claim 17 further comprising causing the memory management unit, based on determining that the metadata is compatible, to proceed with translation operations.

20. The method of claim 17 wherein the tag controller is any of: part of a memory controller of the computing device, located immediately before a last level cache of the cache hierarchy where the last level cache stores data and metadata separately, between a last level cache of the cache hierarchy and the memory controller of the computing device.

* * * * *